US008432955B2

(12) United States Patent
Cendrillon et al.

(10) Patent No.: US 8,432,955 B2
(45) Date of Patent: Apr. 30, 2013

(54) METHOD FOR ROBUST CROSSTALK PRECODER TRAINING IN CHANNELS WITH IMPULSE NOISE

(75) Inventors: Raphael Jean Cendrillon, Hong Kong (CN); Liming Fang, Shenzhen (CN); Guozhu Long, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 338 days.

(21) Appl. No.: 12/830,960

(22) Filed: Jul. 6, 2010

(65) Prior Publication Data
US 2011/0007788 A1 Jan. 13, 2011

Related U.S. Application Data

(60) Provisional application No. 61/224,738, filed on Jul. 10, 2009.

(51) Int. Cl.
*H04B 1/38* (2006.01)
(52) U.S. Cl.
USPC .............................................. 375/222
(58) Field of Classification Search .................. None
See application file for complete search history.

(56) References Cited

U.S. PATENT DOCUMENTS

| 7,809,116 | B2 * | 10/2010 | Rhee et al. | 379/1.04 |
| 7,809,996 | B2 * | 10/2010 | Cioffi | 714/704 |
| 8,094,710 | B1 * | 1/2012 | Liu | 375/233 |
| 2006/0029147 | A1 * | 2/2006 | Tsatsanis | 375/267 |
| 2006/0078044 | A1 * | 4/2006 | Norrell et al. | 375/222 |
| 2006/0222098 | A1 * | 10/2006 | Sedarat et al. | 375/260 |
| 2006/0253515 | A1 * | 11/2006 | Sedarat | 708/446 |
| 2007/0183526 | A1 * | 8/2007 | Norrell et al. | 375/265 |
| 2007/0230548 | A1 * | 10/2007 | Van de Wiel et al. | 375/219 |
| 2008/0130478 | A1 * | 6/2008 | Schenk | 370/201 |

(Continued)

FOREIGN PATENT DOCUMENTS

| CN | 101453245 A | 6/2009 |
| EP | 2107692 A1 | 10/2009 |

(Continued)

OTHER PUBLICATIONS

Nipp-Nai, "Pre-published American National Standard for Telecommunications-Dynamic Spectrum Management," ATIS Standard, ATIS-PP-0600007, 2007, 98 pages.

(Continued)

*Primary Examiner* — David C. Payne
*Assistant Examiner* — Bahman Badipour
(74) *Attorney, Agent, or Firm* — Conley Rose, P.C.; Grant Rodolph; Clint Wilkins (57) ABSTRACT

An apparatus comprising a first transceiver at a central office (CO) coupled to a second transceiver at a customer premise equipment (CPE) via a digital subscriber line (DSL), a crosstalk precoder coupled to the first transceiver at the CO, and a vectoring control entity (VCE) coupled to the transceiver via a feedback channel and to the crosstalk precoder, wherein the second transceiver comprises a noise monitor configured to detect non-crosstalk noise in a downstream signal from the CO to the CPE, and wherein the first transceiver is configured to receive a predefined special feedback signal from the second transceiver that indicates whether non-crosstalk noise is detected in the downstream signal instead of a measured error value.

20 Claims, 5 Drawing Sheets

U.S. PATENT DOCUMENTS

| | | | | |
|---|---|---|---|---|
| 2009/0252234 A1* | 10/2009 | Samdani et al. | ............... | 375/254 |
| 2009/0296792 A1 | 12/2009 | Fang | | |
| 2010/0061437 A1* | 3/2010 | Samdani et al. | ............... | 375/227 |
| 2012/0027069 A1* | 2/2012 | Clausen et al. | ............... | 375/224 |

FOREIGN PATENT DOCUMENTS

| | | | |
|---|---|---|---|
| WO | 2006102125 A2 | | 9/2006 |
| WO | 2006102125 A3 | | 9/2006 |
| WO | WO 2006102125 A2 | * | 9/2006 |
| WO | 2007000547 A2 | | 1/2007 |

OTHER PUBLICATIONS

Oksman, Vladimir, et al., "G.Vector: Addressing Impulse Noise and RFI in Reports of Error Samples," ITU-T SG15/Q4, 09XC-075, Jul. 2009, 3 pages.

Wei, Dong, et al., "G.Vector: Robust Crosstalk Precoder Training in the Presence of Impulse Noise," ITU-T SG15/Q4, 09XC-069, Jul. 2009, 3 pages.

"G. Vector: Draft Text for G. Vector," Temporary Document 09XC-R18, Q4/SG 15, Jul. 2009 (available to ITU members in Jun. 2009), 75 pages.

Foreign Communication From a Related Counterpart Application, PCT Application PCT/CN2010/075078, International Search Report dated Oct. 28, 2010, 3 pages.

Foreign Communication From a Related Counterpart Application, PCT Application PCT/CN2010/075078, Written Opinion dated Oct. 28, 2010, 7 pages.

Foreign Communication From a Related Counterpart Application, European Application 10796738.2, Extended European Search Report dated Oct. 28, 2011, 7 pages.

Haas, S., "Adopting QAM or DMT in VDSL," vol. 35, Communication World, China Academic Journal Electronic Publishing House, Dec. 18, 2002, pp. 46-47.

Foreign Communication From A Related Counterpart Application, Mexico Application MX/a/2011/006107, Mexican Office Action dated Jun. 15, 2012, 2 pages.

"G. Vector: Draft text for G. Vector," ITU-T Temporary Document 09XC-R18R1, Jul. 27-31, 2009, 79 pages.

Foreign Communication Related to a Counterpart Application, Mexican Application MX/A/2011/006107, Mexican Office Action dated Oct. 8, 2012, 2 pages.

* cited by examiner

METHOD FOR ROBUST CROSSTALK PRECODER TRAINING IN CHANNELS WITH IMPULSE NOISE

CROSS-REFERENCE TO RELATED APPLICATIONS

The present application claims priority to U.S. Provisional Patent Application No. 61/224,738 filed Jul. 10, 2009 by Raphael Jean Cendrillon, et al. and entitled, "Method for Robust Crosstalk Precoder Training in Channels with Impulse Noise," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk introduces noise in DSL systems and reduces the data-rates that can be achieved in the DSL systems. Thus, crosstalk can significantly limit the performance of DSL technologies that use higher frequency bands, such as very high bit rate DSL 2 (VDSL2). Crosstalk can be canceled or reduced by joint processing or precoding of downstream signals in multiple subscriber lines that may be bundled, e.g. in a binder, at the network end. Crosstalk precoding is a technique in which signals from a set of signals at the network central office (CO) are pre-distorted prior to transmission through the binder. A pre-distortion filter or 'precoding matrix' is used to pre-distort the signals, and thus cancel crosstalk that occurs between the lines in the binder. The signals may then arrive at the receivers at different customer sites substantially free of crosstalk, thereby achieving significantly higher data-rates.

A crosstalk precoder can be used in a modem, e.g. at the CO, to eliminate or reduce crosstalk in the subscriber lines. The crosstalk precoder uses precoding coefficients, e.g. in a precoding matrix, to modify the signals in the lines and transmits the pre-distorted signals downstream from the CO to a plurality of customer premise equipments (CPEs). The introduced pre-distortions in the signals substantially cancel the crosstalk in the signals that are received by the CPEs. The crosstalk precoder is trained or initialized using feedback signals from the CPEs, which indicate the errors in the received signals at the CPEs. To train the crosstalk precoder, a VDSL transceiver office unit (VTU-O) at the CO sends a sequence of pilot symbols downstream to a VDSL transceiver remote unit (VTU-R) at a CPE, which returns corresponding error feedback signals to a Vectoring Control Entity (VCE) coupled to the VTU-O and the crosstalk precoder. The error feedback signals from the CPEs are then used to update the precoding matrix coefficients and thus adjust the pre-distorted signals until reaching convergence.

SUMMARY

In one embodiment, the disclosure includes an apparatus comprising a first transceiver at a CO coupled to a second transceiver at a CPE via a DSL, a crosstalk precoder coupled to the first transceiver at the CO, and a VCE coupled to the transceiver via a feedback channel and to the crosstalk precoder, wherein the second transceiver comprises a noise monitor configured to detect non-crosstalk noise in a downstream signal from the CO to the CPE, and wherein the first transceiver is configured to receive a predefined special feedback signal from the second transceiver that indicates whether non-crosstalk noise is detected in the downstream signal instead of a measured error value.

In another embodiment, the disclosure includes a network component comprising at least one processor coupled to a memory and configured to receive a downstream DSL signal from a CO, detect whether the downstream DSL signal is corrupted by non-crosstalk noise, send an error feedback signal to the CO that indicates a measured error due to crosstalk noise in the downstream DSL signal if the downstream DSL signal is not substantially corrupted by non-crosstalk noise, and send a special feedback signal to the CO that indicates that non-crosstalk noise has been detected instead of the measured error in the downstream DSL signal if the downstream DSL signal is substantially corrupted by non-crosstalk noise.

In yet another embodiment, the disclosure includes a method comprising obtaining an error sample for a tone in a received symbol from a CO, detecting that the tone is corrupted if the error sample is corrupted due to impulse noise or clipping or is otherwise unreliable, and sending an error vector that comprises a special predefined value for the error sample to a VCE coupled to a crosstalk precoder to indicate to the VCE that the error sample and the tone are corrupted, wherein the special value for the error sample comprises a real component and an imaginary component that each comprise the same quantity of bits $L_w$, and wherein all the bits in the real component and in the imaginary component are equal to one.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, a plurality of CPEs in a DSL system may receive a sequence of symbols from the CO that is corrupted by relatively large noise bursts, for example due to impulse noise. The impulse noise may be characterized by several peaks or bursts of relatively high levels and short time intervals. Due to the impulse noise, the CPEs may not accurately measure the errors in the tones that reflect the proper amount of crosstalk noise, and therefore send inappropriate and misleading error feedback signals to the CO. The error feedback signals may be received by a VCE in the CO, which may provide inappropriate precoding coefficients based on the inappropriate error feedback signals. The inappropriate precoding coefficients may be used by a crosstalk precoder in the CO to add incorrect pre-distortions to subsequent symbols from the CO to the CPEs. The CPEs may also receive symbols that comprise substantially large signal levels that exceed the dynamic range of the system receivers, e.g. due to time varying radio frequency interference (RFI) or out-of-domain crosstalk. Due to the limited dynamic range of the receivers, the substantially large signal levels may be clipped. In this case, the CPEs may also fail to accurately measure the errors in the tones of the symbols that reflect the proper amount of crosstalk noise and may send incorrect error feedback signals to the CO. Such may cause the crosstalk precoder to add incorrect pre-distortions in subsequent symbols from the CO to the CPEs. The incorrect pre-distortions in the signals transmitted from CO may not properly compensate for the crosstalk noise and consequently may disrupt the crosstalk training/tracking process, slow down the training time, degrade system performance in terms of achievable datarates, or combinations thereof.

Disclosed herein is a system and method for providing improved error feedback signals from the CPEs to avoid adding incorrect pre-distortions in subsequent symbols by the crosstalk precoder, e.g. due to impulse noise, RFI, out-of-domain crosstalk, and/or other non-crosstalk noise sources. Accordingly, a VTU-R at the CPE may comprise an impulse noise monitor that monitors the received downstream signals from the CO for impulse noise and/or other non-crosstalk noise. If the impulse noise monitor detects impulse noise and/or other non-crosstalk noise in the symbols received by the VTU-R, the VTU-R may send a special or reserved error signal to the VCE to prevent the crosstalk precoder from updating its coefficients using incorrect error signals and hence avoid disrupting the crosstalk training/tracking process. Subsequently, if the impulse noise monitor does not detect more impulse noise and/or non-crosstalk noise in the received symbols, the VTU-R may resume sending error feedback signals that reflect proper amount of crosstalk noise to the VCE and the crosstalk precoder training/tracking may be resumed.

Figure 1:
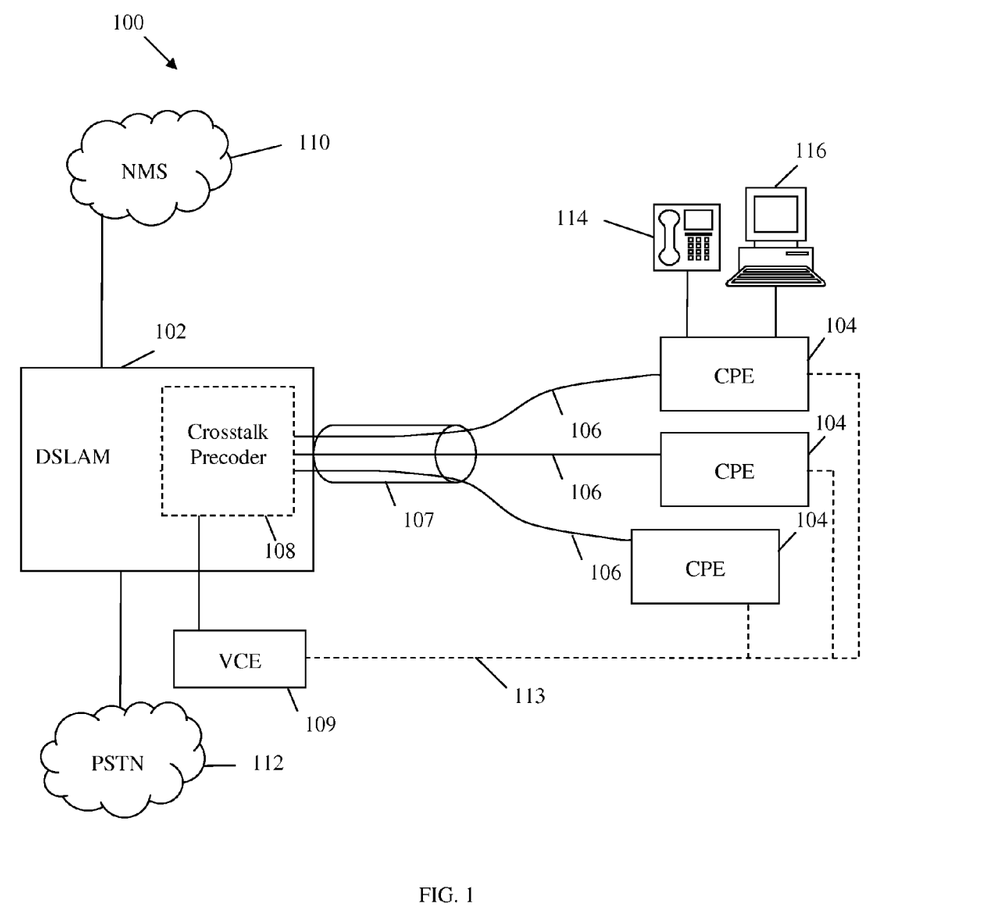
FIG. 1 is a schematic diagram of an embodiment of a DSL system.

FIG. 1 illustrates one embodiment of a DSL system 100. The DSL system 100 may be a VDSL or VDSL2 system, an asymmetric DSL (ADSL) or ADSL2 system, or any other DSL system. The DSL system 100 may comprise a Digital Subscriber Line Access Multiplexer (DSLAM) 102 at the CO side and a plurality of CPEs 104, which may be coupled to the DSLAM 102 via a plurality of subscriber lines 106. Some of the subscriber lines 106 may be bundled in a binder 107. The DSLAM 102 may comprise a crosstalk precoder 108, which may be coupled to a plurality of subscriber lines 106. Additionally, the DSL system 200 may comprise a VCE 109 that may be coupled to the crosstalk precoder 108 and the CPEs 104 via a plurality of feedback channels 113. The feedback channels 113 between the CPEs 104 and the VCE 109 (shown in dotted lines) may correspond to upstream logical data paths from the CPEs 104 to the DSLAM 102 and may not be physically separated from the subscriber lines 106 (shown in solid lines). The CPEs 104 may transmit the error feedback signals in the feedback channels 113 through the subscriber lines 106 to a plurality of corresponding receivers in the DSLAM 102, which may then extract the error feedback signals from the upstream data stream and send the error feedback signals to VCE 109. Additionally, the DSLAM system 102 may optionally comprise a network management system (NMS) 110 and a public switched telephone network (PSTN) 112. In other embodiments, the DSLAM system 102 may be modified to include splitters, filters, management entities, and various other hardware, software, and functionality. The NMS 110 may be a network management infrastructure that processes data exchanged with the DSLAM 102 and may be coupled to one or more broadband networks, such as the Internet. The PSTN 112 may be a network that generates, processes, and receives voice or other voice-band signals.

The DSLAM 102 may be located at the CO side of the DSL system 100 and may comprise switches and/or splitters, which may couple the NMS 110, the PSTN 112, and the subscriber lines 106. For instance, the splitter may be a 2:1 coupler that forwards data signals received from the subscriber lines 106 to the NMS 110 and the PSTN 112, and forwards data signals received from the NMS 110 and the PSTN 112 to the subscriber lines 106. Further, the splitter may optionally comprise one or more filters to help direct data signals between the NMS 110, the PSTN 112, and the subscriber lines 106. Additionally, the DSLAM 102 may comprise at least one DSL transmitter/receiver (transceiver), e.g. a VTU-O, which may exchange signals between the NMS 110, the PSTN 112, and the subscriber lines 106. The signals may be received and transmitted using the DSL transceiver, such as a modem.

The DSL transceiver or VTU-O of the DSLAM 102 may comprise a forward error correction (FEC) codeword generator that generates FEC data. The DSL transceiver may also comprise an interleaver that interleaves the transmitted data across a plurality of tones in a group of symbols. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the DSLAM 102 may be configured to transmit data at similar or different rates for each subscriber line 106.

The CPEs 104 may be located at the customer premises, where at least some of the CPEs 104 may be coupled to a telephone 114 and/or a computer 116. The telephone 114 may be hardware, software, firmware, or combinations thereof that generates, processes, and receives voice or other voice-band signals. The CPE 104 may comprise a switch and/or a splitter, which may couple the subscriber lines 106 and the telephone 114 and the computer 116. The CPE 104 may also comprise a DSL transceiver, e.g. a VTU-R, to exchange data between the CPE 104 and the DSLAM 102 via the subscriber line 106. For instance, the splitter may be a 2:1 coupler that forwards data signals received from the subscriber line 106 to the telephone 114 and the DSL transceiver, and forwards voice signals received from the telephone 114 and data signals from the DSL transceiver to the subscriber line 106. The splitter may optionally comprise one or more filters to help direct signals to and from the telephone 114 and the DSL transceiver.

The DSL transceiver or VTU-R of the CPE 104, e.g. a modem, may transmit and receive signals through the subscriber lines 106. For instance, the DSL transceiver may process the received signals to obtain the transmitted data from the DSLAM 102, and pass the received signals to the telephone 114, the computer 116, or both. The CPEs 104 may be coupled to the DSLAM 102 directly via the subscriber lines. For example any of the CPEs 104 may be coupled to a subscriber line 106 from the DSLAM 102. The CPEs 104 may access the NMS 110, the PSTN 112, and/or other coupled networks via the subscriber lines 106 deployed by the DSLAM 102.

The subscriber lines 106 may be telecommunications paths between the DSLAM 102 and the CPE 104, and may comprise one or more twisted-pairs of copper cable. Crosstalk interference may occur between a plurality of subscriber lines 106 that are deployed by the DSLAM 102, e.g. in the binder 107. The crosstalk interference may be related to the power, frequency, and travel distance of the transmitted signals and may limit the communications performance in the network. For instance, when the power spectral density (PSD) of the transmitted signals increase, e.g. over a range of frequencies, the crosstalk between the adjacent subscriber lines 106 may increase and hence the data rates may decrease. The propagation of the signals in the downstream direction from the DSLAM 102 to the CPEs 104 may be represented by:

$$y = Hx + z, \quad (1)$$

where y is a vector that represents the signals at the CPEs 104, H is a matrix that represents the crosstalk channels in the lines, x is a vector that represents the signals from the DSLAM 102, and z is a vector that represents random errors or noise.

The crosstalk precoder 108 may be configured to reduce or limit the crosstalk in the lines. The crosstalk precoder 108 may transmit pre-distorted downstream signals in the subscriber lines 106 to cancel or reduce crosstalk error in the lines. The crosstalk precoder 108 may process a plurality of downstream signals from the DSLAM 102 transmitter (e.g. from a plurality of VTU-Os), add distortion to the downstream signals, and transmit the pre-distorted downstream signals to the CPEs 104 via the subscriber lines 106. The pre-distorted signals may be generated by the crosstalk precoder 108 whose parameters are properly chosen to minimize the crosstalk in the downstream channels. In order for the crosstalk precoder to select the appropriate parameters, the CPEs 104 may send back the error signals in the downstream receivers as feedback for the precoder 108 to update its parameters. For instance, a plurality of VTU-Rs at the CPEs 104 may measure the errors for a plurality of received symbols (e.g. DMT symbols) from the crosstalk precoder 108, and transmit back to the VCE 109 a plurality of corresponding error feedback signals, via a feedback channel.

Typically, the feedback channel 113 may be established through upstream data signal paths from the CPEs 104 to the DSLAM 102, which may be provided in addition to upstream communications data. The upstream receivers in the DSLAM 102 may isolate the error feedback signals from the upstream communications data and send the error feedback signals to the VCE 109. The VCE 109 may be configured to control the crosstalk precoder 108 to adapt the crosstalk precoder 108 based on the error feedback signals from the CPEs 104. Thus, the crosstalk precoder 108 may send appropriate pre-distorted signals to the CPEs 104, which may properly cancel or substantially reduce the crosstalk in the downstream signals received at the CPEs 104. The VCE 109 may use the error feedback signals from the VTU-Rs at the CPEs 104 to identify the crosstalk channels in the lines, calculate precoding coefficients, and update a precoding matrix for the crosstalk precoder 108. The precoding matrix may comprise the precoding coefficients, which may be calculated based on an adaptive algorithm, such as a least mean square (LMS) algorithm or a recursive least square (RLS) algorithm, or other proper algorithms. The crosstalk precoder 108 may use the precoding coefficients and matrix to produce the pre-distorted signals for the lines. Cancelling the crosstalk using signal distortion may be represented by:

$$\begin{aligned} y &= HPx + z \\ &= \mathrm{diag}\{H\}x + z, \end{aligned} \quad (2)$$

where $P = H^{-1} \mathrm{diag}\{H\}$ and is a precoding matrix configured to cancel or substantially eliminate the crosstalk channels in the lines.

The process of sending the symbols to the VTU-Rs and receiving corresponding error feedback signals may be repeated over multiple periods of time during downstream transmissions to improve the output of the crosstalk precoder 108, and hence improve crosstalk cancelation. Such periods of time may be referred to as the training or initialization time of the crosstalk precoder 108. During training time, a sequence of pilot symbols may be transmitted and accordingly a sequence of error feedback signals may be received (e.g. for each subscriber line 106) until the pre-distorted pilot symbols from the crosstalk precoder 108 converge to a pattern or value. After initialization, the CPEs 104 may continue to calculate or measure the error signals in the received downstream data symbols and send back error feedback signals to the DSLAM 102, which may then forward the error feedback signals to the VCE 109 to continue updating the precoding coefficients to track the crosstalk channel variations.

In some cases, the CPE 104 may receive downstream symbols that are corrupted by impulse noise, RFI noise, out-of-domain crosstalk noise, other non-crosstalk noise, or combinations thereof. In such cases, the CPE 104 may incorrectly calculate or measure the errors corresponding to crosstalk noise in the received signals. For instance, the VTU-R (e.g. the slicer) at the CPE 104 may incorrectly demap a received Quadrature Amplitude Modulated (QAM) symbol that comprises impulse noise, out-of-range signals, and/or clipped signals. Further, some signals may comprise signal values that may be outside the dynamic range of the receiver and hence may be distorted by clipping. As such, the VTU-R may send incorrect error feedback signals to the VCE 109, and consequently the crosstalk precoder 108 may be updated using the incorrect error feedback signals, and add incorrect pre-distortions in the subsequently transmitted symbols based on the improper precoding coefficients due to incorrect error feedback signals.

To avoid the disruptive effects of impulse noise, out-of-range signals, and/or clipped signals on the crosstalk training process, the VTU-R at the CPE 104 may send a special or reserved error signal to the VCE 109 in response to detecting impulse noise, out-of-range signals, and/or clipped signals. When the reserved signal is received by the VCE 109, the crosstalk training process may be paused, e.g. until a subsequent proper error feedback signal that properly represents crosstalk noise is received from the VTU-R. Additionally or alternatively, the VTU-R may send an error feedback signal that comprises a flag to indicate to the VCE 109 that impulse noise, an out-of-range signal, and/or a clipped signal has been detected at the CPE 104.

Figure 2:
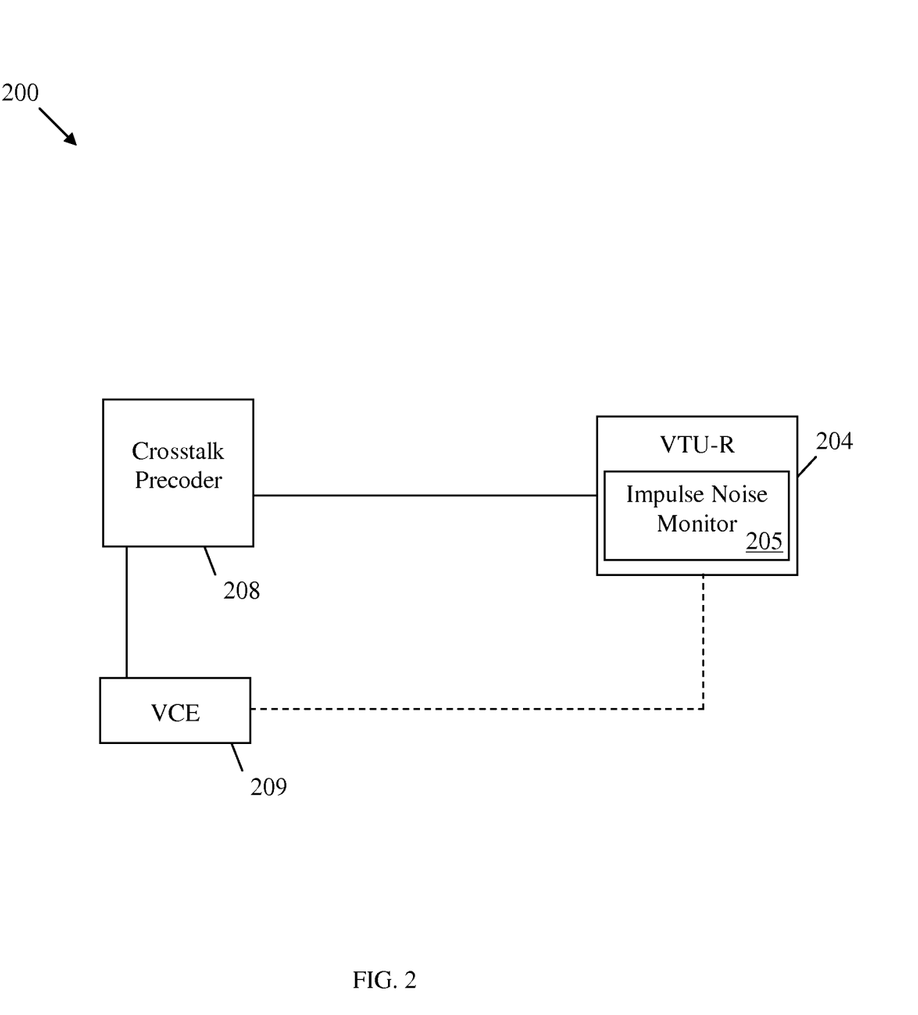
FIG. 2 is a schematic diagram of an embodiment of a crosstalk training system.

FIG. 2 illustrates an embodiment of a crosstalk training system 200, which may be used in the DSL system 100 to cancel or substantially reduce crosstalk. Additionally, the crosstalk training system 200 may account for impulse noise, out-of-range signals, and/or clipped signals to improve the crosstalk training process, e.g. avoid training time slow down and/or data-rate reduction. The crosstalk training system 200 may comprise a VTU-R 204 that comprises an impulse noise monitor 205, a crosstalk precoder 208 coupled to the VTU-R 204, and a VCE 209 coupled to the VTU-R 204 and the crosstalk precoder 208. The VTU-R 204 and the VCE 209 may be coupled via the upstream data paths from the VTU-R 204 to a VTU-O (not shown) at the DSLAM (e.g. DSLAM 102). The components of the crosstalk training system 200 may be substantially similar to the corresponding components of the DSL system 100. The VTU-R 204 may be located at a CPE, e.g. the CPE 104, and may communicate with a corresponding VTU-O (not shown) at the CO, e.g. at the DSLAM 102. The VTU-O may be coupled to the crosstalk precoder 208 and the VCE 209, which may also be located at the CO.

The impulse noise monitor 205 may be configured to monitor the received signals from the VTU-O and to detect the presence of any significant impulse noise in the signals. For instance, the impulse noise monitor 205 may detect a plurality of signal peaks or bursts that correspond to impulse noise levels. The signal peaks or bursts may be above the expected DSL signal levels and may be detected in the received signals over periods of time. For example, the signal bursts may be detected over a plurality of received DMT symbols that may exceed the expected downstream signal levels. The impulse noise monitor 205 may also detect the burst of relatively large error signals in a plurality of tones, which may indicate the presence of relatively strong impulse noise.

The VTU-R 204 may be configured to send a special or reserved error signal to the VCE 209 when the impulse noise monitor 205 detects impulse noise, out-of-range signals, and/or clipped signals. The VTU-R 204 may send the special or reserved error signal to the VCE 209 instead of incorrect error feedback signals due to impulse noise or other non-crosstalk noise to prevent the updating the crosstalk precoder 208 with incorrect error feedback and thus generating incorrect pre-distorted downstream signals to the VTU-R 204 based on improper precoding coefficients. For instance, the VTU-R 204 may set the error feedback signal to a value that indicates that impulse noise, out-of-range signals, and/or clipped signals were detected. The VCE 209 may receive the reserved error feedback signal from the VTU-R 204, and hence pause the crosstalk training process, e.g. until proper error feedback signals are subsequently sent from the VTU-R 204. Specifically, upon receiving the reserved error feedback signal, the VCE 209 may not update the precoding coefficients for the crosstalk precoder 208 and thus prevent the crosstalk precoder 208 from drifting away from appropriate coefficient values and thus adding inappropriate pre-distortions to the downstream signals from the VTU-O.

The VTU-R 204 may set the error feedback signal to a sequence of all zeros when the impulse noise monitor 205 detects impulse noise, out-of-range signals, and/or clipped signals. The VCE 209 may update the precoding coefficients and matrix for the crosstalk precoder 208 using the zero sequence, which may not change the coefficients of the crosstalk precoder 208. This may prevent the divergence of precoding coefficients due to impulse noise. However, if the VTU-R 204 continues to send the sequence of zeros to the VCE 209, e.g. as a result of further detecting impulse noise and/or other non-crosstalk noise, the VCE 209 may end the crosstalk training process prematurely before properly evaluating and compensating for the crosstalk noise levels in the system.

To avoid ending the crosstalk training process prematurely, the VTU-R 204 may alternatively set the error feedback signal to a non-zero reserved sequence, e.g. of a sequence of all ones, or other reserved special value, to indicate to the VCE 209 that impulse noise or other non-crosstalk noise was detected. When the VCE 209 receives the reserved sequence, the VCE 209 may become aware of impulse noise and/or other non-crosstalk noise in the downstream signals at the VTU-R 204 noise and consequently may not update the precoding coefficients for the crosstalk precoder 208. The VCE 209 may also be aware that the pause in the coefficients update is temporary due to the presence of impulse noise, and hence may wait for subsequent correct error feedback signals from the VTU-R 204 that reflect proper crosstalk noise in the system.

After sending the reserved error feedback signal to the VCE 209 in response to detecting the impulse noise and/or other non-crosstalk noise, the VTU-R 204 may resume receiving downstream signals that are not corrupted by impulse noise or other non-crosstalk noise. Thus, the VTU-R 204 may resume sending error feedback signals to the VCE 209, which may properly represent crosstalk noise in the received signals. Such error feedback signals may be different than the special or reserved error feedback signal, e.g. the non-zero sequence or the sequence of all ones. Consequently, the VCE 209 may resume updating the precoding coefficients and the crosstalk precoder 208 may add proper pre-distortions in the downstream signals. Thus, the crosstalk training/tracking process may continue and the crosstalk precoder 208 may reach the optimal coefficients that provide optimal pre-distorted downstream signals to achieve optimal crosstalk cancellation.

In some embodiments, the VTU-R 204 may send the same reserved error feedback signal or different reserved error feedback signals to the VCE 209, which may indicate different non-crosstalk noise sources in the received downstream signals, e.g. impulse noise, out-of-range signals, and/or clipped signals. For example, the VTU-R 204 may send a first reserved error feedback value that indicates detecting impulse noise bursts in the received signals and at least a second reserved error feedback signal that indicates detecting other non-crosstalk noise signals in the received signal.

In an embodiment, the VTU-R 204 may send a special or reserved value in the error feedback signal to the VCE 209 that indicates that a tone in the received symbol is corrupted due to impulse noise, RFI, out-of-domain crosstalk, or other non-crosstalk noise source. The error feedback signal that corresponds to a symbol may comprise a plurality of error vectors that corresponds to a plurality of tones in the received pilot symbol. The error vectors may indicate the measured errors in the received tones, for example a plurality of normalized errors in the received tones. The VTU-R 204 may set all the bits in the error vector that correspond to a tone in the pilot symbol to all ones to indicate that it has detected a corrupted tone due to non-crosstalk noise. The error signal for the tone may comprise a real component and an imaginary component, which may be both set to all ones when the VTU-R 204 detects impulse noise and/or other non-crosstalk noise in the tone. Further, if a substantial quantity of corrupted tones are detected in the received pilot symbol, such as at least half (or a specified threshold) of the tones in the symbol, the entire symbol may be unsuitable to evaluate crosstalk noise. As such, the measured errors for all the tones (e.g. normalized errors) may be discarded and the VTU-R 204 may set the bits of the real and imaginary components of all the error vectors in the error feedback signal, which correspond to all the tones in the symbol, to all ones.

Figure 3:
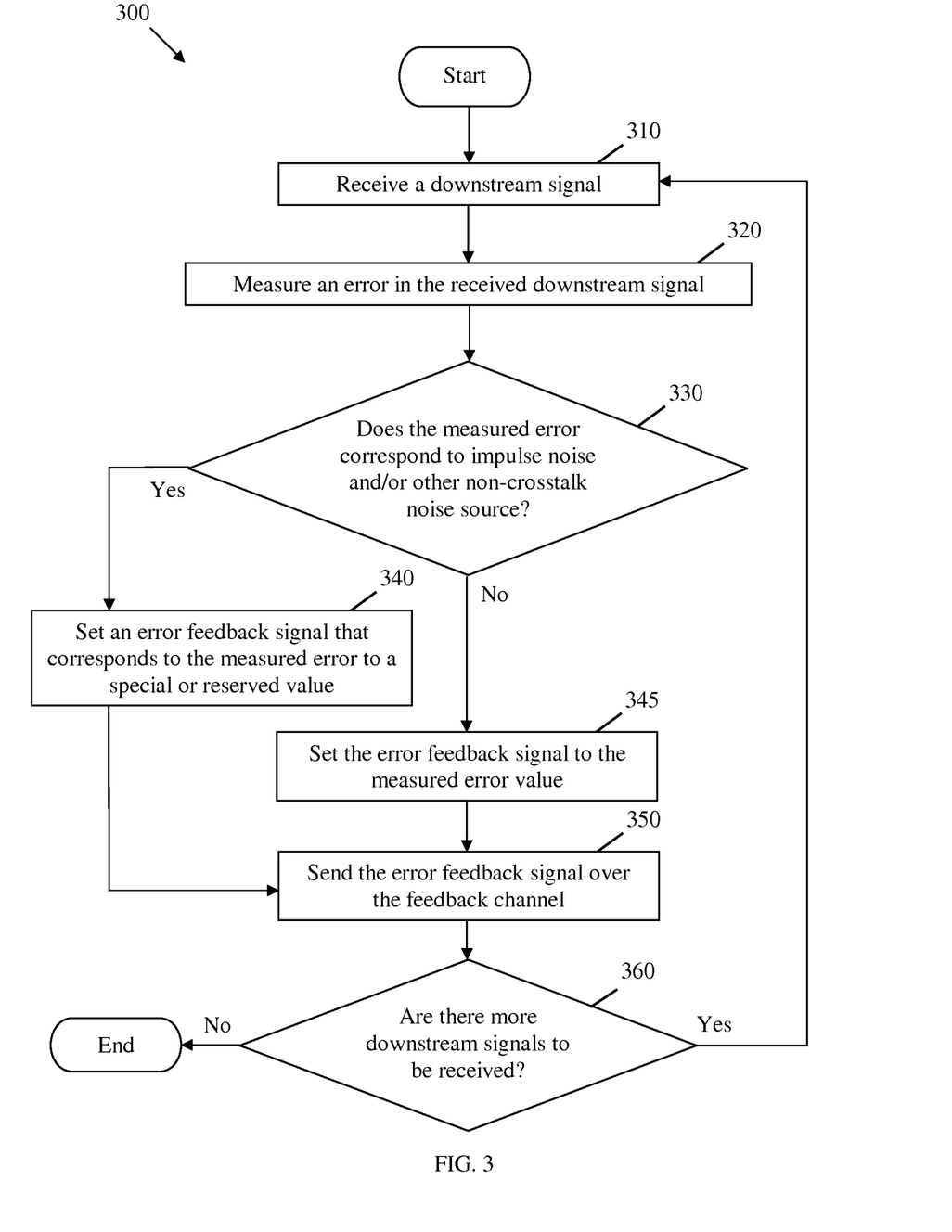
FIG. 3 is a flowchart of an embodiment of a crosstalk training method.

FIG. 3 illustrates an embodiment of a crosstalk training method 300, which may be used to improve crosstalk training in a DSL system, e.g. the DSL system 100, and account for impulse noise and/or other noise sources. For instance, the crosstalk training method 300 may be implemented by the VTU-R 204 and the impulse noise monitor 205 in the crosstalk training system 200. The method 300 may begin at block 310, where a downstream signal may be received. For example, the VTU-R 204 at the CPE 104 may receive a tone in a DMT symbol from the VTU-O at the central office. At block 320, an error in the received downstream signal may be measured. The error may be caused by crosstalk interference, impulse noise, and/or other noise sources. For example, the VTU-R 204 may measure the error value in the received signal based on the expected signal value of the tone in the symbol. At block 330, the method 300 may determine whether the measured error is corrupted by impulse noise and/or other non-crosstalk noise source. For example, the impulse noise monitor 205 may process the measured error and/or received signal to detect any relatively large bursts due to impulse noise, any substantially high levels that exceed the dynamic range, any relatively large error values, and/or error due to RFI. The method 300 may proceed to block 340 if the condition in block 330 is met. Otherwise, the method 300 may proceed to block 345.

At block 340, an error feedback signal that corresponds to the measured error may be set to a special or reserved value. For example, the VTU-R 204 may set the bits in the error feedback signal that corresponds to the corrupted tone to all ones. In another embodiment, a flag that corresponds to the measured error or tone may be set in the error feedback signal to indicate that a non-crosstalk noise source has been detected in the downstream signal at the CPE. Alternatively, at block 345 the error feedback signal may be set to the measured error value, e.g. due to crosstalk noise. At block 350, the error feedback signal may be sent over the feedback channel, e.g. to the VCE 209. At block 360, the method 300 may determine whether there are more downstream signals to be received. The method 300 may return to block 310 if the reception of downstream signal continues. Otherwise, the method 300 may end.

Figure 4:
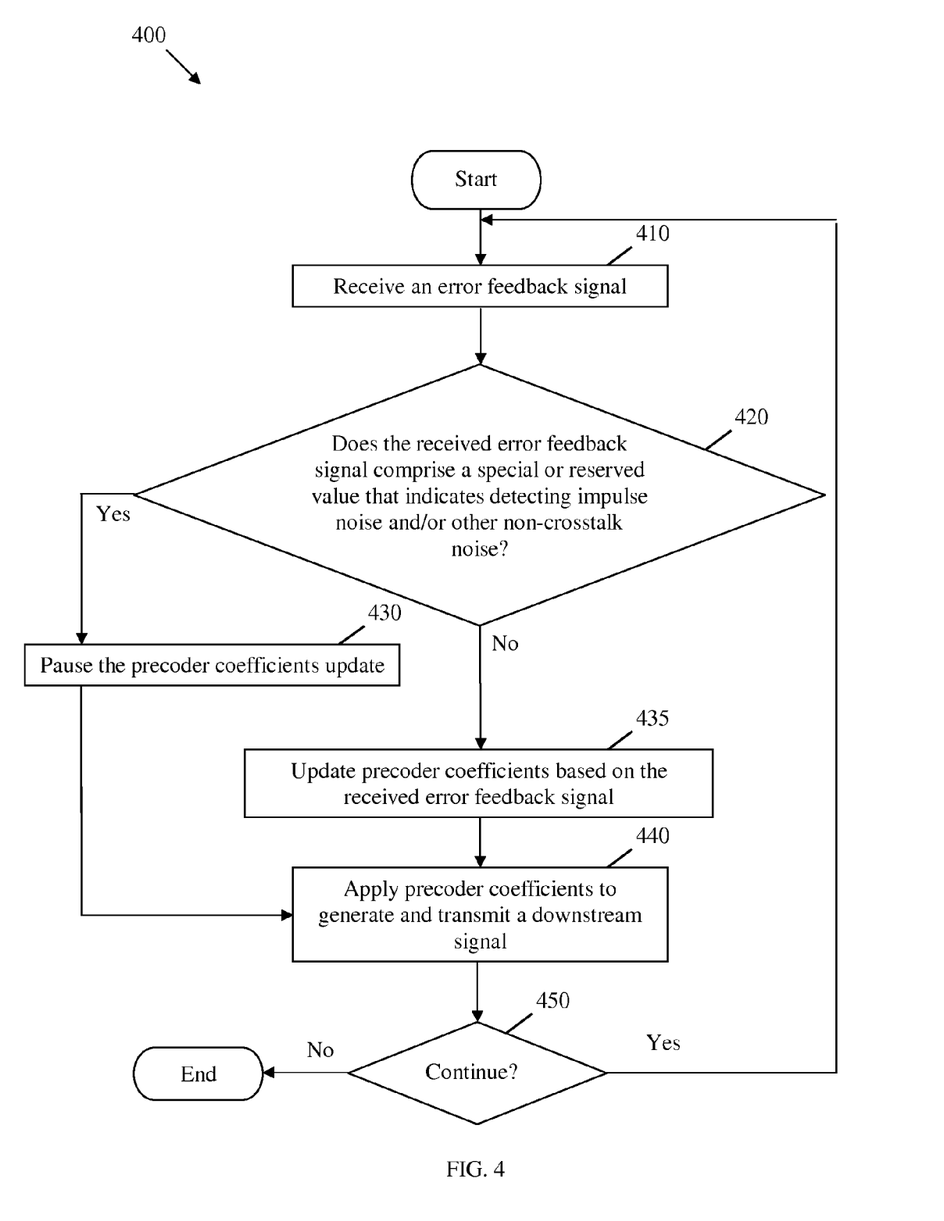
FIG. 4 is a flowchart of another embodiment of a crosstalk training method.

FIG. 4 illustrates another embodiment of a crosstalk training method 400, which may be used to improve crosstalk training in a DSL system, e.g. the DSL system 100, and account for impulse noise and/or other noise sources. For instance, the crosstalk training method 300 may be implemented by the VCE 209 and the crosstalk precoder 208 in the crosstalk training system 200. The method 400 may begin at block 410, where an error feedback signal may be received. For example, the VCE 209 at the central office may receive an error feedback signal from the VTU-R 204 via the feedback channel, which may be through the upstream data path. The error feedback signal may comprise a plurality of error vectors that represent a plurality of measured errors for a plurality of tones in a downstream symbol received at the VTU-R 204. At block 420, the method 400 may determine whether the received error feedback signal comprises a special or reserved value that indicates detecting impulse noise and/or other non-crosstalk noise. For example, the VCE 209 may check whether any error vector in the error feedback signal comprises a special or reserve sequence, e.g. a sequence of all ones, which may be set by the VTU-R 204 due to detecting a corrupted tone. In another embodiment, the VCE 209 may check whether a reserved flag in the error feedback signal that corresponds to the tone in the symbol is set to indicate that a significant or substantial non-crosstalk noise source was detected at the VTU-R. The method 400 may proceed to block 430 if the condition in block 420 is met. Otherwise, the method 400 may proceed to block 435.

At block 430, the precoder coefficient update is paused. For instance, the VCE 209 may not update the precoder coefficients for the crosstalk precoder 208, and thus the last updated precoder coefficients 208 may be still be used to generate pre-distortion to the next transmitted downstream signal from the VTU-O to the VTU-R 204. Alternatively, at block 435 the precoder coefficients may be updated based on the received error feedback signal. For instance, the VCE 209 may update the precoder coefficients using the error feedback signal from the VTU-R 204, and thus the crosstalk precoder 208 may add better pre-distortion to the next transmitted downstream signal according to the updated precoder coefficients. At block 440, the precoder coefficients may be applied to generate and transmit a downstream signal, e.g. from the VTU-O to the VTU-R 204. At block 450, the method 400 may determine whether to continue (or repeat), e.g. to process a second error feedback signal, or to end. If a second feedback signal was transmitted, the method 400 may return to block 410. Otherwise, the method 400 may end.

Figure 5:
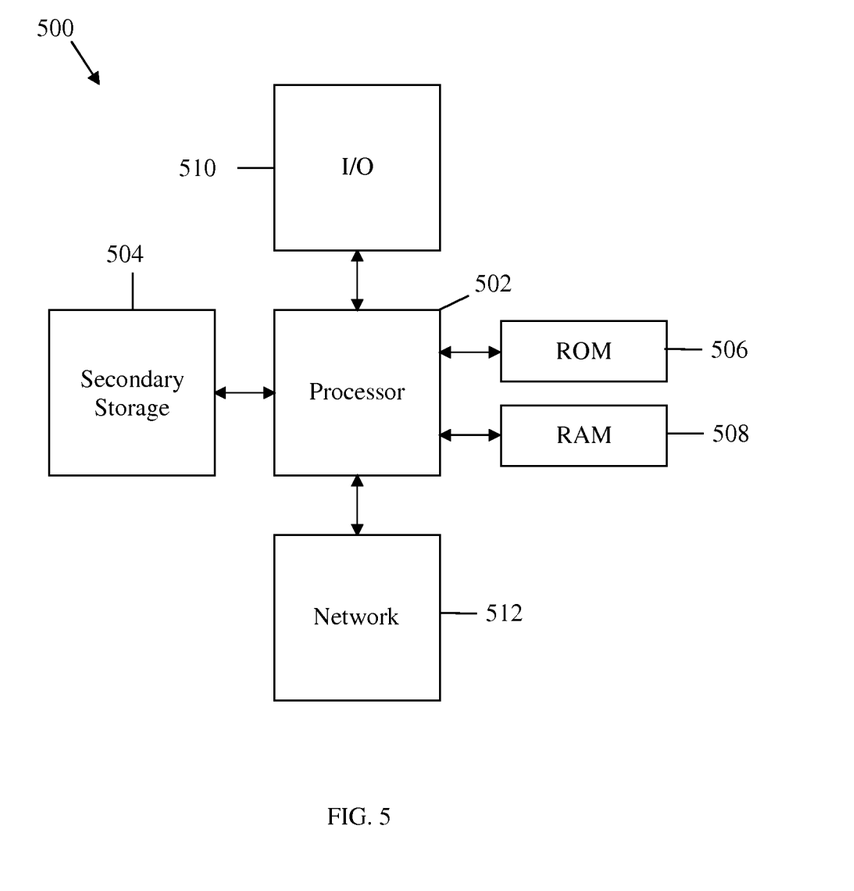
FIG. 5 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 may include a processor 502 (which may be referred to as a central processor unit or CPU) that is in communication with any memory devices including secondary storage 504, read only memory (ROM) 506, random access memory (RAM) 508, input/output (I/O) devices 510, and network connectivity devices 512, or combinations thereof. The processor 502 may be implemented as one or more CPU chips, or may be part of one or more application specific integrated circuits (ASICs).

The secondary storage 504 is typically comprised of one or more disk drives or other storage devices and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first transceiver at a central office (CO) configured to transmit a downstream signal to a second transceiver at a customer premise equipment (CPE) via a digital subscriber line (DSL);
a crosstalk precoder coupled to the first transceiver at the CO; and
a vectoring control entity (VCE) coupled to the first transceiver via a feedback channel and to the crosstalk precoder,
wherein the first transceiver is further configured to receive a predefined feedback signal from the second transceiver that indicates that non-crosstalk noise is detected in the downstream signal instead of a measured error value.

2. The apparatus of claim 1, wherein the downstream signal comprises a discrete multi-tone (DMT) symbol that comprises a plurality of tones, wherein the predefined feedback signal is part of an error feedback signal comprising a plurality of error vectors that correspond to the tones, and wherein each of the error vectors comprises a real component that comprises a quantity of bits and an imaginary component that comprises a quantity of bits.

3. The apparatus of claim 2, wherein each of the real component and the imaginary component comprises the same quantity of bits.

4. The apparatus of claim 2, wherein the bits in the real component and the imaginary component of an error vector are set to a pre-determined value when non-crosstalk noise is detected in a tone that corresponds to the error vector.

5. The apparatus of claim 4, wherein the bits in the real component and the imaginary component of an error vector are set to all binary ones when non-crosstalk noise is detected in a tone that corresponds to the error vector.

6. The apparatus of claim 1, wherein the non-crosstalk noise corresponds to impulse noise in the downstream signal, and wherein the downstream signal is corrupted by a plurality of bursts of relatively high level and short time duration noises.

7. The apparatus of claim 1, wherein the non-crosstalk noise corresponds to radio frequency interference (RFI) noise or out-of-domain crosstalk noise in the downstream signal, and wherein the downstream signal comprises a plurality of substantially large signal levels that exceed the dynamic range of the transceiver.

8. The apparatus of claim 7, wherein the downstream signal is distorted by clipping due to abnormally high signal levels, and wherein signal clipping results in incorrect measured error values.

9. The apparatus of claim 1, wherein the VCE is configured to allow the crosstalk precoder to update a plurality of precoding coefficients that corresponds to a plurality of error feedback signals from the second transceiver that indicates a plurality of measured error values, and wherein the VCE restricts the crosstalk precoder from updating a precoding coefficient that corresponds to an error feedback signal that indicates detecting non-crosstalk noise.

10. The apparatus of claim 1, wherein the predefined feedback signal comprises a flag that indicates that the noise monitor of the second transceiver has detected non-crosstalk noise in the downstream signal.

11. A network component comprising:
at least one processor coupled to a memory and configured to:
receive a downstream digital subscriber line (DSL) signal from a central office (CO);
detect whether the downstream DSL signal is corrupted by non-crosstalk noise;
send an error feedback signal to the CO that indicates a measured error due to crosstalk noise in the downstream DSL signal if the downstream DSL signal is not substantially corrupted by non-crosstalk noise; and
send an error feedback signal to the CO that indicates that non-crosstalk noise has been detected instead of the measured error in the downstream DSL signal if the downstream DSL signal is substantially significantly corrupted by non-crosstalk noise.

12. The network component of claim 11, wherein an error vector in the error feedback signal is set to a predefined value that is different than the measured error to indicate detecting non-crosstalk in the downstream DSL signal.

13. The network component of claim 12, wherein the predefined value is equal to a sequence of all zeros.

14. The network component of claim 12, wherein the predefined value is equal to sequence of all binary ones.

15. The network component of claim 11, wherein an error vector in the error feedback signal is set to different reserved values to indicate detecting different non-crosstalk noise sources in the downstream DSL signal, and wherein the reserved values are different than the measured error.

16. The network component of claim 11, wherein the downstream DSL signal corresponds to symbols that are transmitted from a very high bit rate DSL transceiver central office unit (VTU-O) and pre-distorted by a crosstalk precoder at the CO.

17. The network component of claim 11, wherein the non-crosstalk noise comprises impulse noise, out-of-range errors, clipped signal errors, or combinations thereof.

18. A method comprising:
  obtaining an error sample for a tone in a received symbol from a central office (CO);
  detecting that the tone is corrupted if the error sample is corrupted due to impulse noise or clipping or is otherwise unreliable; and
  sending an error vector that comprises a special predefined value for the error sample to a vectoring control entity (VCE) coupled to a crosstalk precoder to indicate to the VCE that the error sample and the tone are corrupted,
  wherein the special value for the error sample comprises a real component and an imaginary component that each comprise the same quantity of bits $L_w$, and
  wherein all the bits in the real component and in the imaginary component are equal to one.

19. The method of claim 18, wherein the VCE receives the error vector, ignores the error sample for the tone, and skips updating the crosstalk precoder on the tone.

20. The method of claim 18, wherein the received symbol is a sync symbol, wherein the special predefined value indicates that the entire symbol is corrupted due to impulse noise or clipping or is otherwise unreliable, and wherein the VCE receives the error vector, ignores the error sample for the tone and all remaining error samples for all the tones in the sync symbol, and skips updating the crosstalk precoder on all the tones for the sync symbol.

* * * * *